3,326,847
DYEABLE POLYOLEFINS
Aristotle G. Prapas and Robert W. Stevenson, Edison Township, Middlesex County, N.J., assignors to Mobil Oil Corporation, a corporation of New York
No Drawing. Filed July 14, 1964, Ser. No. 382,647
20 Claims. (Cl. 260—41)

This invention relates to polyolefins having improved receptivity to dyes. It is more particularly concerned with dyeable polyolefin compositions comprising an inorganic substance.

As is well known to those familiar with the art, polyolefins, and in particular tactic polyolefins such as tactic polypropylene, are very difficult to dye evenly. Especially great difficulties are encountered in dyeing a polyolefin after it has been formed into the shape in which it will be used, e.g. a film, a fiber or a fabric made from the fiber, since the dye cannot be dispersed throughout the solid polyolefin shape, but must be adhered to its surface. Many dyes do not adhere at all, while others give speckled coloring with large untinted areas.

Numerous methods have been proposed to increase dyeability. It has been proposed to graft copolymerize dye-receptive monomers onto polyolefin backbones. It has also been proposed to blend polar organic materials with polyolefins. However, incorporation of various of such organic dyeability enhancers has led to undesirable reduction of the melting point of the polyolefin composition.

It is an object of this invention to provide normally solid polyolefins having improved receptivity to dyes. Another object is to provide a method for improving the dye-receptivity of normally solid tactic polyolefins. A specific object is to provide tactic polyolefins which can be dyed while in substantially solid form. Other objects and advantages of this invention will become apparent to those skilled in the art, from the following detailed description.

It has been found that the foregoing objects can be realized by incorporating in a normally solid polyolefin a minor amount, based on the weight of said polyolefin and sufficient to improve the dyeability thereof, of an alumino-silicate.

The polyolefins contemplated herein are the normally solid polymers or copolymers of one or more olefinic hydrocarbons having the formula $CH_2=CHR$, wherein R is hydrogen, aryl, cycloalkyl, or an alkyl group having between 1 and 8 carbon atoms. Particularly contemplated as the polyolefins of the present invention are polymers of olefins having relatively low molecular weight, e.g. polyethylene, polypropylene, polybutene-1, etc. Also particularly contemplated as the polyolefins of the present invention are tactic polyolefins.

The term "tactic" is a generic term applied to polymers in which there is an ordered structure with respect to the configurations around at least one main-chain site of steric isomerism per conventional base unit. Numerous types of tacticity are recognized in the art. Within the contemplation of this invention, a measure of steric order is the weight percent of the solid polymer that is insoluble in boiling n-heptane. A linear polymer of one or more mono-olefinic hydrocarbons that is insoluble in boiling n-heptane is considered to be tactic.

The linear tactic polymers may be composed of isotactic or syndiotactic chains, blocks or mixtures of these forms. The terms isotactic and syndiotactic are used in accordance with the suggested definitions tentatively approved by the Commission on Macromolecules of the Internation Union of Pure and Applied Chemistry, as outlined in the Journal of Polymer Science, volume 56, page 153–161 (1962). When prepared from two or more different olefin monomers, the tactic polymer can be a block copolymer comprised of tactic blocks of each monomer. In practice, tactic polymers often contain sequences of atactic units in conjunction with tactic sequences. These polymers containing atactic sequences can nevertheless be insoluble in boiling n-heptane and accordingly are tactic polymers within the contemplation of this invention. Tactic polymers utilizable in this invention include those which are at least 80 percent tactic (80 percent insoluble in boiling n-heptane) and particularly those that are at least 95 percent tactic. Non-limiting examples of tactic polymers contemplated herein include polypropylene, poly-1-butene, poly-1-pentene, poly-1-hexene, poly-1-heptene, poly-3-methyl-1-butene, poly-4-methyl-1-pentene, poly-3,3-dimethyl-1-butene, poly-4,4-dimethyl-1-pentene, poly-4-methyl-1-hexene, poly-5-methyl-1-hexene, polyvinyl cyclohexane, and others.

The inorganic substance incorporated with a polyolefin to enhance its dyeability according to the present invention is an alumino-silicate. Although various types of alumino-silicates are useful for present purposes, naturally occurring alumino-silicates are particularly suitable. Alumino-silicates having an average particle size smaller than about 10 microns are effective as dyeability enhancers; those having an average particle size between about .01 micron and 1 micron are especially preferred for rendering a polyolefin receptive to deep and/or level dyeing.

The amount of alumino-silicate incorporated into a polyolefin in accordance with this invention is that amount sufficient to effect the desired degree of improvement in the dyeability of the polyolefin. Generally, such an amount will be between about 0.1 percent and about 10 percent, preferably between about 0.1 percent and about 5 percent, by weight of the dyeable polyolefin-containing composition in which it has been incorporated.

In addition to the alumino-silicate, the dyeable polyolefin compositions of this invention can contain minor amounts of other materials for various purposes. For example, there can be incorporated a small amount of an anti-oxidant or stabilizer. If the polymer is to be dyed with an acid dye, other dyeing adjuvants such as polyvinylpyrrolidone can be used, generally in an amount between 0.1 percent and 5 percent, by weight of the dyeable polyefine- and alumino-silicate-containing composition to which it has been added.

The alumino-silicates can be incorporated into the polyolefin, in accordance with this invention, by any technique suitable for thorough mixing, e.g. by blending in a Waring Blendor. Preferably, the alumino-silicate is substantially dry and finely divided, when combined with the polyolefin. Advantageously, the polyolefin and alumino-silicate are thoroughly mixed in an organic (non-aqueous) medium, such as in an alcohol of low molecular weight, after which the mixture is dried to remove the organic medium and further blended in a suitable blending apparatus, such as a plastograph, a kneading mixer, or the like, preferably under an inert gas, e.g. nitrogen.

The following specific examples are for the purpose of illustrating the novel polyolefin of improved dye receptivity and the method for producing them according to the present invention. It will be understood that this invention is not limited to the specific polyolefins and alumino-silicates used in the examples, nor to the particular operations and manipulations involved. Other polyolefins, other alumino-silicates and other techniques for their combination can be used, as those skilled in the art will readily understand.

EXAMPLE I 97.5 parts by weight of polypropylene were blended with 2.5 parts by weight of a naturally occurring alumino-silicate marketed by Minerals and Chemicals Phillip Corporation, designated ASP 17OT and characterized by the following:

*Typical chemical composition (after drying) and properties*

| Components [1]: | Weight percent |
|---|---|
| $SiO_2$ | 45 |
| $Al_2O_3$ | 39 |
| $TiO_2$ | 1.5 |
| Trace components ($Fe_2O_3'$, $K_2O$, $Na_2O$, etc.) | [2] 0.1–0.2 |
| Loss on ignition (carbonates; other volatiles) | 14 |
| | 100 |

[1] Expressed as oxides.
[2] Or less, each.

| | |
|---|---|
| Average particle size microns | 0.55 |
| Maximum percent residue in 325 mesh sieve wt. percent | 0.01 |
| pH (determined by T.A.P.P.I. Method T645M–54) | 6.3–7.0 |
| Oil absorption (measured by ASTM Method D28–31) | 37–41 |
| Refractive index | 1.56 |
| Specific gravity | 2.58 |
| G.E. brightness index | 90–92 |

The blending was carried out first in a Waring Blendor with 2-propanol and, after drying, in a plastograph under nitrogen. The blend was compression molded into films of about 3 mil thickness and subjected to dye receptivity tests which were also carried out for comparative purposes with polypropylene control films containing no alumino-silicates or other dyeability-enhancing substances. For the dye receptivity tests, the dye baths were adjusted with acetic acid and sodium acetate to a pH of 5.3. Both the polypropylene-alumino-silicate blend and the polypropylene control film were dyed with a xanthene dye, Calcozine Red BX, with Du Pont Sevron Brilliant Red 4G and a methine dye, Sevron Yellow R. The alumino-silicate-containing blend was dyed more readily than the control film with each of the dyes. The blend was dyed most satisfactorily with the Calcozine Red. Good results were also obtained with Sevron Red and Sevron Yellow. Level dyeing of the blend was obtained with each of the dyes.

EXAMPLE II 97.5 parts (by weight) of polypropylene were blended with 2.5 parts of an alumino-silicate product of Minerals and Chemicals Phillip Corporation designated ASP 200 and characterized by properties identical to those of the ASP 170 alumino-silicate used in Example I except for a pH (determined by the same method) of 3.8–5.2 and a G.E. brightness index of 86.5–88. Blending, film preparation and dyeings were carried out in the manner described in Example I. The alumino-silicate-containing blend was more receptive than the polypropylene control film to each of the dyes. Particularly excellent results were obtained with Sevron Yellow, which gave the blend a deep level shade. Calcozine Red and Sevron Red also gave good level dyeings. Each of the dyes gave blend shades even deeper than those obtained from the corresponding blend-dyeing tests of Example I.

Although the present invention has been described with preferred embodiments, resort to modifications and variations can be had without departing from the spirit and scope of the invention, as those skilled in the art will readily appreciate. Such variations and modifications are therefore considered to be within the purview and scope of the appended claims.

We claim:

1. A composition comprising a normally solid polymer of an olefinic hydrocarbon and a minor amount, based on the weight of said polymer and sufficient to improve the dyeability thereof, of an alumino-silicate.

2. A composition, as defined in claim 1, in which said polymer of an olefinic hydrocarbon is a tactic polymer.

3. A composition, as defined in claim 1, in which said alumino-silicate is characterized by having an average particle size smaller than about 10 microns.

4. A composition, as defined in claim 3, in which said average particle size is between about 0.01 micron and about 1 micron.

5. A composition, as defined in claim 1, in which said alumino-silicate is a naturally occurring alumino-silicate.

6. A composition, as defined in claim 1, in which said minor amount is between about 0.1 percent and about 10 percent of the combined weight of said polymer and said alumino-silicate.

7. A composition, as defined in claim 6, in which said minor amount is between about 0.1 percent and about 5 percent of the combined weight of said polymer and said alumino-silicate.

8. A composition comprising normally solid polypropylene and a minor amount, based on the weight of said polypropylene and sufficient to improve the dyeability thereof, of an alumino-silicate.

9. A composition, as defined in claim 8, in which said polypropylene is tactic polypropylene.

10. A composition, as defined in claim 8, in which said alumino-silicate is characterized by having an average particle size smaller than about 10 microns.

11. A composition, as defined in claim 10, in which said average particle size is between about 0.01 micron and about 1 micron.

12. A composition, as defined in claim 8, in which said alumino-silicate is a naturally occurring alumino-silicate.

13. A composition, as defined in claim 8, in which said minor amount is between about 0.1 percent and about 10 percent of the combined weight of said polymer and said alumino-silicate.

14. A composition, as defined in claim 13, in which said minor amount is between about 0.1 percent and about 5 percent of the combined weight of said polymer and said alumino-silicate.

15. A method for improving the dyeability of a normally solid polymer of an olefinic hydrocarbon, comprising incorporating in said polymer a minor amount, based on the weight of said polymer and sufficient to improve the dyeability thereof, of an alumino-silicate.

16. A method, as defined in claim 15, in which said minor amount is between about 0.1 percent and about 10 percent of the combined weight of said polymer and said alumino-silicate, and said alumino-silicate is characterized by having an average particle size between about 0.1 micron and about 10 microns.

17. A method, as defined in claim 15, in which said alumino-silicate is incorporated in said normally solid polymer by blending said alumino-silicate and said polymer in an organic liquid medium, drying the resulting mixture to remove substantially all of the organic medium, and blending the dried mixture.

18. A method for improving the dyeability of normally solid polypropylene, comprising incorporating in said polypropylene a minor amount, based on the weight of said polypropylene and sufficient to improve the dyeability thereof, of an alumino-silicate.

19. A method, as defined in claim 18, in which said minor amount is between about 0.1 percent and about 10 percent of the combined weight of said polypropylene and said alumino-silicate, and said alumino-silicate is characterized by having an average particle size between about 0.1 mircon and about 10 microns.

20. A method, as defined in claim 18, in which said alumino-silicate is incorporated in said normally solid polypropylene by blending said alumino-silicate and said polyproplene in an organic liquid medium, drying the resulting mixture to remove substantially all of the organic medium, and blending the dried mixture.

References Cited

UNITED STATES PATENTS

| | | | |
|---|---|---|---|
| 2,808,385 | 10/1957 | Caldwell | 260—41 |
| 2,921,042 | 1/1960 | Caldwell | 260—41 |
| 3,208,984 | 9/1965 | Dekking | 260—41 |

FOREIGN PATENTS 942,440  11/1963  Great Britain.

MORRIS LIEBMAN, *Primary Examiner.*

J. S. WALDRON, S. L. FOX, *Assistant Examiners.*